United States Patent [19]
Leitzke

[11] Patent Number: 4,592,689
[45] Date of Patent: Jun. 3, 1986

[54] RING SPRING COTTER

[76] Inventor: Rue S. Leitzke, P.O. Box 537, Hustisford, Wis. 53034

[21] Appl. No.: 613,812

[22] Filed: May 25, 1984

[51] Int. Cl.⁴ .............................................. F16B 21/18
[52] U.S. Cl. .................................... 411/358; 411/530
[58] Field of Search ............... 411/210, 211, 218–221, 411/250, 351, 352, 358, 513, 516, 530, 945, 946; 403/316, 379

[56] References Cited

U.S. PATENT DOCUMENTS

| | | | |
|---|---|---|---|
| 2,287,634 | 6/1942 | Niven | 411/530 |
| 3,175,453 | 3/1965 | Williams | 411/352 |
| 3,695,140 | 10/1972 | Noble | 411/352 |
| 4,205,586 | 6/1980 | MacNeill | 411/530 |
| 4,298,299 | 11/1981 | Quarles | 411/514 |

FOREIGN PATENT DOCUMENTS

| | | | |
|---|---|---|---|
| 285227 | 1/1965 | Netherlands | 411/530 |
| 45221 | 3/1915 | Sweden | 411/514 |

Primary Examiner—Gary L. Smith
Assistant Examiner—Neill Wilson
Attorney, Agent, or Firm—Wheeler Law Firm

[57] ABSTRACT

This disclosure relates to a ring spring cotter in which the ring portion lies partially over and partially under the straight run of the cotter which extends through the hole in the pin to be secured, and in which a free tail has a ramp which may either overlie or underlie the straight run that extends through the hole to exert tension either to secure the ring or to free it. It is easy to use, secure, and damps vibration of the parts secured by spring pressure on them.

4 Claims, 7 Drawing Figures

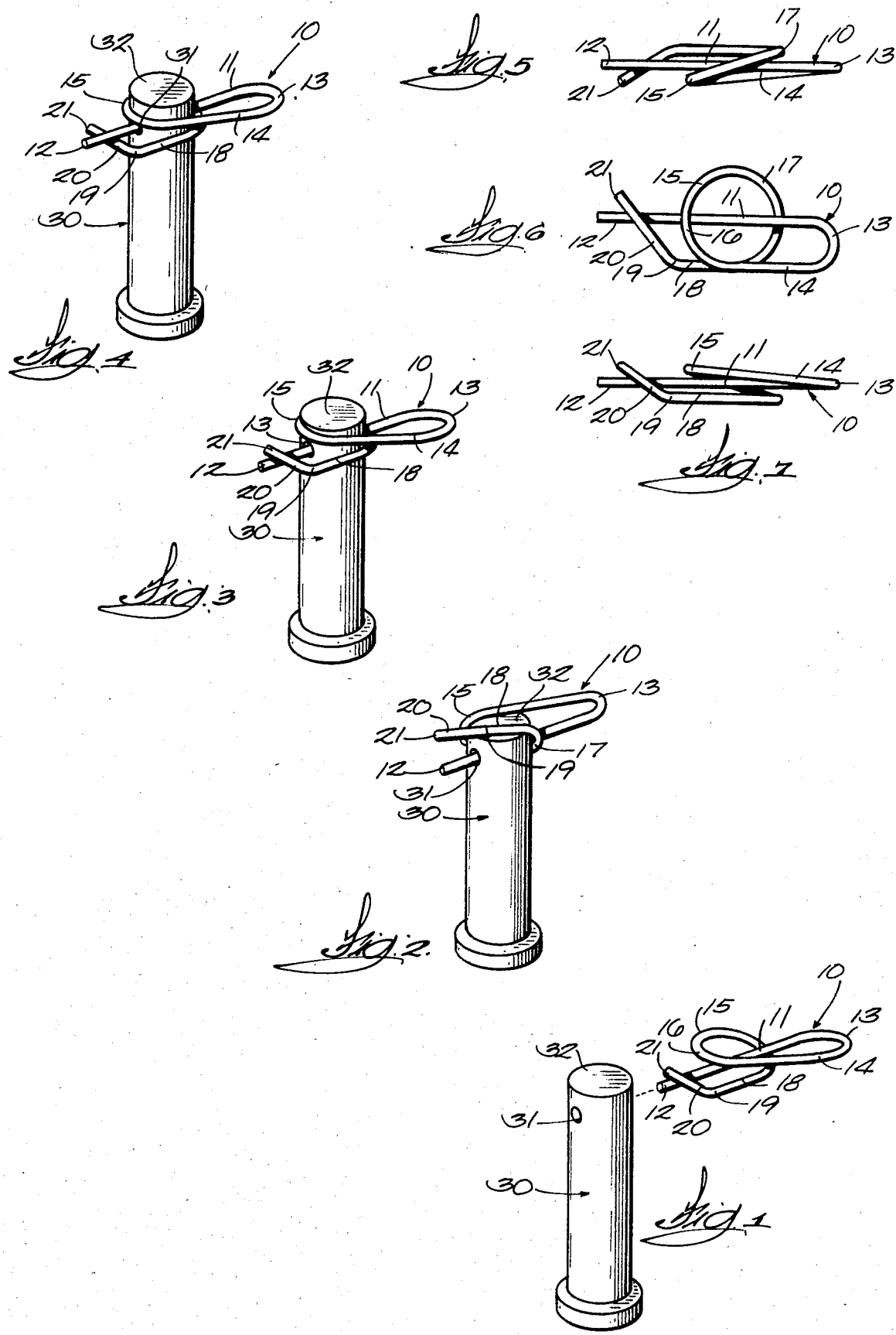

RING SPRING COTTER

BACKGROUND OF THE INVENTION

Other cotter pins and ring cotter pins are well known but no pin is known having a form comparable to the present invention which offers a pin which is particularly secure when properly spoiled and is nevertheless rather easy to remove and to reapply without damage to the pin.

SUMMARY OF THE INVENTION

The essence of applicant's invention is the provision of a cotter pin integral with a ring's having the leading edge lying over the run of the pin that extends through the shaft to be secured and the trailing edge of the ring lie under the shaft to be secured and in which the trailing edge of the ring is attached to a cam ramp which may overlie the straight run of the cotter for insertion and removal or underlie it for security.

DRAWINGS

FIG. 1 is a perspective view of a shaft with my spring ring cotter at one side ready to install.

FIG. 2 is a similar view with my spring ring partly installed.

FIG. 3 is a similar view with my spring in place.

FIG. 4 is a similar view with my spring locked in place.

FIG. 5 is a back view of my spring ring.

FIG. 6 is a top view of my spring ring.

FIG. 7 is a front view of my spring ring cotter.

DETAILED DESCRIPTION

Although the disclosure hereof is detailed and exact to enable those skilled in the art to practice the invention, the physical embodiments herein disclosed exemplify the invention which may be embodied in other specific structure. The scope of the invention is defined in the claims appended hereto.

The novel cotter of this application consists of a wire generally designated as 10 having a straight run 11 sized to be received in a hole in a pin to be retained. Run 11 has a free end 12 and a second end comprising a smooth bend 13 of 180° having a diameter equal to the radius of ring 15 to which bend 13 is connected by a second shorter staight run 14. Considering the portion of ring 15 which first contacts the pin when free end 12 is inserted in a hole in the end of a pin, ring 15 has a leading edge 16 which overlies straight run 11 and a trailing edge 17 which underlies straight run 11 followed by a short straight run 18 which underlies straight run 14 and the leading edge 16 of ring 15. Finally, at the leading edge of straight run 18 is a bend 19 followed by a straight run 20 comprising a ramp and the other free end 21 of wire 10.

Ring 15 is of a size to fit closely around the pin 30. The pin is provided with a cotter pin hole 31 through which straight run 11 of the rue ring spring cotter is to be inserted. As shown, pin 30 has a head at one end and a hole for a cotter at the other end but forms of in may be used. The pin is well known.

In applying the cotter of this invention of this invention to pin 30 and hole 31 the free end 12 of the cotter is first inserted. Ramp 20 which stands at an angle to run 11 both in the vertical and the horizontal plane forms a cam surface which rides on pin 30 and twists ring 15 about fulcrum provided by run 18 bearing on the beginning of ring 15 at the end of run 14, because cam or ramp 20 is being forced upwardly while run 18 underlies run 14. This pushes trailing edge 17 of ring 15 downwardly and simultaneously pushes leading edge 16 of ring 15 upwardly to ride over the end 32 of pin 31. When ramp 20 is pushed beyond the circumference of pin 30 it drops due to the spring tension in wire 10. That allows trailing edge 17 of ring 15 to rise and leading edge 16 of ring 15 to fall as it reaches the circumference of pin 30 until leading edge 16 strikes run 11 and stops. To lock the cotter into place the user then twists ramp 20 until free end 21 clears free end 12 to lie under free end 12 rather than over it. That applies a further upward torque on the trailing edge 17 of ring 15 and a further downward torque torque on leading edge 16 of ring 15 so that ring 15 can no longer be lifted to clear the end 32 of pin 30 and wire 10 is therefore firmly locked into place until the operations just described are reversed.

To move the cotter, ramp 20 is twisted from its position under free end 12 of run 11 to lie over run 11 allowing ring 15 to lift so that leading edge 16 clears the edge of the end 32 of pin 30 whereupon the cotter may be withdrawn easily.

The wire of the cotter is preferably so dimensioned with regard to its size, and formed of a material of such hardness and springiness, that the operations described may be performed over and over.

For example, a ring spring cotter may be made of 0.035 inch stainless steel wire to fit a ¼ inch shaft. Ring 15 will be sized to fit the shaft, that is the I.D. will be 0.025 inch. Bend 13 will be 0.125 inch. The entire length of the pin including run 12 and part of bend 13 will preferably be about 0.875 inch. Ramp 20 desirably extends 15 degrees to 20 degrees upward and about 50 degrees inward from a line generally aprallel to run 12 and including runs 14 and 18. These dimensions are purely by way of example and do not limit the possible dimensions.

One function of my device that is best seen by considering FIG. 5 or FIG. 7 is the fact that when the device is completely installed portions 18 and 19 will bear on whatever parts are being held on pin 30 by the cotter. It will be understood that a cotter pin is never placed on a shaft such as 3 alone but serves to maintain the relationship between the shaft 3 and parts through which the shaft 3 passes. The shaft may be holding the parts together, or may serve as a pivot, but in any case the cotter of this invention damps vibration. That is an important benefit of the design.

I claim:

1. In a spring ring cotter pin made of a single piece of wire having a first free end and a second free end the novelty comprising:

said wire having a straight run adapted to extend through a cotter hole and bent back on itself to form a ring having a leading edge above the straight run and a trailing edge below the straight run, the leading and trailing edges of the ring overlapping at the side of the straight run to form a fulcrum attached to a second free end of the wire, so that raising the second free end of the wire tilts the ring in a direction to permit the straight run and the first free end of the wire to be inserted in a cotter hole in such a manner that the ring encircles the shaft to be secured with both sides of said ring passing around said shaft simultaneously in the direction of movement of said straight run and lowering the second free end tilts the ring in a direction to capture the shaft to prevent withdrawal of the straight run from the cotter hole, said second free end comprising a portion bent at an angle to the fulcrum portion and extending upwardly and inwardly past the first free end.

2. The device of claim 1 in which th second free end extends above the first free end in a first state in which the cotter is to be applied to a shaft having a cotte hole and in which said second free end is of such a length that it may be twisted beneath the first free end to a second position when the cotter is to be retained in the cotter hole to secure the ring about the shaft containing the cotter hole.

3. The device of claim 1 in which the second free end forms a cam surface which strikes the shaft containing the cotter hole and is forced upwardly by insertion of the first free end into the cotter ole such that said ring is rotated about said fulcrum in a direction to lift said leading edge and depress said trailing edge, permiting the cotter straight run to enter the cotter hole and the ring to encircle the shaft containing the cotter hole, and wherein as the straight run us inserted the ramp portion clears the circumference of the shaft and drops into engagement with the first free end, permitting siad ring to rotate to capture said shaft and secure said cotter pin in said cotter hole.

4. The device of claim 3 in which said ramp has a portion just at the free end which is bent upwardly to assist in forming the cam.

* * * * *